(12) United States Patent
Orenstien et al.

(10) Patent No.: US 7,043,405 B2
(45) Date of Patent: *May 9, 2006

(54) DISTRIBUTION OF PROCESSING ACTIVITY IN A MULTIPLE CORE MICROPROCESSOR

(75) Inventors: Doron Orenstien, Haifa (IL); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/964,413

(22) Filed: Oct. 12, 2004

(65) Prior Publication Data

US 2005/0050373 A1  Mar. 3, 2005

Related U.S. Application Data

(63) Continuation of application No. 10/020,568, filed on Dec. 6, 2001, now Pat. No. 6,804,632.

(51) Int. Cl.
  *G06F 13/00* (2006.01)
(52) U.S. Cl. ............... 702/188; 702/184; 702/186; 702/189
(58) Field of Classification Search ............. 702/60, 702/176, 182–184, 186, 188, 189; 375/130; 709/224, 230, 225, 226; 714/45, 2, 3, 10, 714/13, 22, 23; 710/105, 106; 712/10, 32; 713/320, 324; 361/764, 783
See application file for complete search history.

(56) References Cited

U.S. PATENT DOCUMENTS

| | | | |
|---|---|---|---|
| 5,502,838 A | 3/1996 | Kikinis | 395/550 |
| 6,182,203 B1 | 1/2001 | Simar, Jr. et al. | 712/22 |
| 6,212,566 B1 * | 4/2001 | Vanhoof et al. | 709/230 |
| 6,363,490 B1 * | 3/2002 | Senyk | 713/300 |
| 6,463,396 B1 * | 10/2002 | Nishigaki | 702/132 |
| 6,470,238 B1 * | 10/2002 | Nizar et al. | 700/299 |
| 6,487,668 B1 * | 11/2002 | Thomas et al. | 713/322 |
| 2001/0022615 A1 | 9/2001 | Fernandez et al. | |
| 2001/0047494 A1 | 11/2001 | Thomas et al. | |

* cited by examiner

*Primary Examiner*—Marc S. Hoff
*Assistant Examiner*—Felix Suarez
(74) *Attorney, Agent, or Firm*—Blakely, Sokoloff, Taylor & Zafman LLP

(57) ABSTRACT

Distribution of processing activity across processing hardware based on power consumption and/or thermal considerations. One embodiment includes a plurality of processing units and a monitor to obtain monitor (e.g., power consumption, or temperature or some combination thereof) values from the processing units. The monitor transfers a process from one processing unit to another in response to the monitor values from the processing units.

48 Claims, 7 Drawing Sheets

DISTRIBUTION OF PROCESSING ACTIVITY IN A MULTIPLE CORE MICROPROCESSOR

RELATED APPLICATIONS

This application is a continuation of application Ser. No. 10/020,568, filed Dec. 6, 2001, now U.S. Pat. No. 6,804,632.

BACKGROUND

1. Field

The present disclosure pertains to the field of electronic components. More particularly, the present disclosure pertains to distributing processing activity across various components or portions of components based on power consumption and/or thermal considerations.

2. Description of Related Art

Effectively monitoring and adjusting the consumption of power and the consequent generation of heat of electronic components is an ongoing struggle. Electronic components such as integrated circuits continue to pack more and more functionality into a smaller area. The result of such increasing density of logic is typically an increase in the power density, the power consumed per unit of area. Higher power consumption per unit area typically results in higher heat generation per unit area. Thus, while increased processing throughput may be achieved by increasing logic density, new and innovative techniques may be desirable to contend with the resultant thermal issues.

Prior art thermal and/or power control apparatuses are typically driven by one or both of two concerns. The first concern is device or system temperature. An electronic device typically has a particular maximum operating temperature, above which damage to the device may occur. Some power consumption limiting techniques aim to prevent electronic devices from surpassing their maximum operating temperature. Reduction of power consumption by reducing operating frequency, operating voltage, or otherwise reducing processing is often done in response to an elevating or elevated temperature (see, e.g., U.S. Pat. No. 5,838,578, "Method and apparatus for programmable thermal sensor for an integrated circuit"). Thus, the typical response is to lower the overall processing level when the temperature is perceived as being too high. Clearly, however, performance may be negatively impacted when the overall processing level is reduced.

A second concern is simply the amount of power being consumed. Often, the design of portable devices is to a large extent driven by battery life. To improve battery life, aggressive power consumption limiting techniques are often employed. These power saving techniques are often triggered by the amount of processing occurring (with aggressive cutbacks upon signs of idle hardware), user selections, the removal of an A/C power source, etc. Again, the typical response is to reduce the overall level of processing or the overall set of enabled hardware by shutting down any idle portions. Here too, the reduction in overall processing obviously can impact performance. Techniques that attempt to power down only idle hardware may impact performance because there may be some latency associated with restarting the hardware or bringing it back up to speed.

Thus, most power consumption control techniques focus on idling existing hardware when not in use or simply reducing the overall throughput or processing level (via voltage, frequency, etc.) to control overall temperature. As power consumption continues to increase in importance as a design consideration, novel techniques to contend with power consumption are desirable.

BRIEF DESCRIPTION OF THE FIGURES

The present invention is illustrated by way of example and not limitation in the Figures of the accompanying drawings.

DETAILED DESCRIPTION

The following description discusses the distribution of processing activity across processing hardware based on power consumption and/or thermal considerations. In the following description, numerous specific details such as logic implementations, system types, processing logic types, and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation. While one embodiment is directed to a microprocessor with multiple cores, the techniques described may more generally be applied to other types of electronic components or across several components.

Various disclosed embodiments re-distribute processing tasks, threads, or computations to different portions of hardware based on power consumption and/or thermal considerations. For example, in one embodiment, processes may be switched between different cores of a multi-core processor. Some embodiments may advantageously spread high power consumption tasks or processes between different processing units. Such spreading or distribution of processes over different hardware may beneficially reduce the peak temperature that is reached by a processing unit. Since some hardware components operate more efficiently at cooler temperatures, more efficient operation (and hence less overall power consumption) may be achieved via the resulting lower overall temperatures in some embodiments. Moreover, in some embodiments, such advantages may be obtained while substantially maintaining performance levels because "hot" and "cool" processes may be swapped between particular hardware units, without necessarily requiring the idling of hardware to achieve some cooling. Additionally, in some embodiments, monitoring techniques may allow independent control of the voltages and operational frequencies of different processing units or cores.

Figure 1:
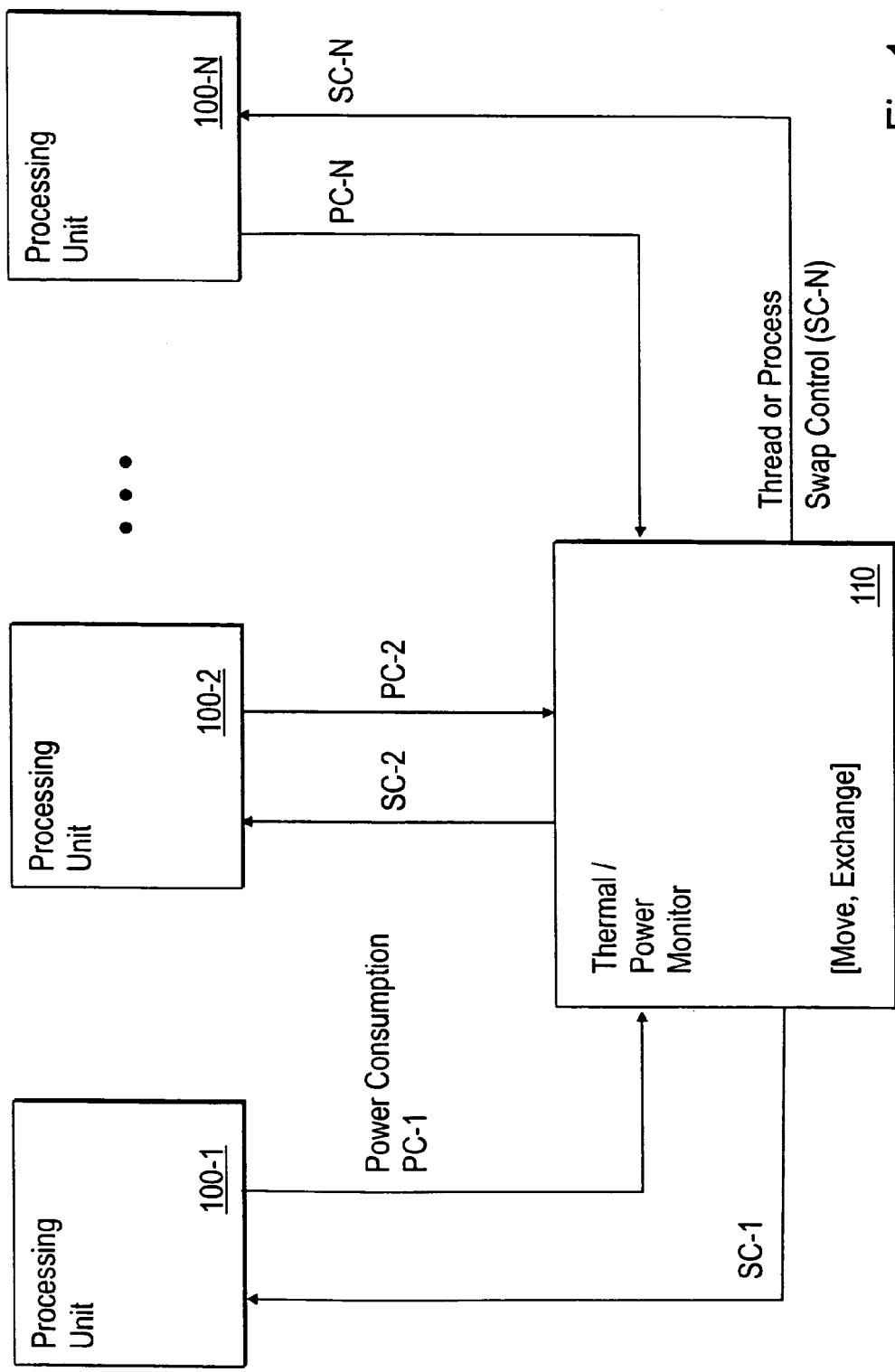
FIG. 1 illustrates one embodiment of a processing apparatus or system having a number of individual processing units among which processes may be swapped under control of a thermal or power monitor.

FIG. 1 illustrates one embodiment of a processing apparatus having a number of individual processing units between which processes may be swapped under control of a thermal or power monitor. As used herein, "swapping" processes between processing units refers not only to an exchange between two processing units, but any rearrangement of the processes so that at least one process is moved to a different processing unit. In the embodiment of FIG. 1, N processing units, processing unit 100-1, 100-2 through 100-N are coupled to a monitor 110. The monitor 110 is a thermal and/or power monitoring unit that monitors the power consumption and/or temperature of the processing units 100-1 through 100-N. In general, the monitor 110 orchestrates process shifting between processing units in order to manage power consumption and particularly thermal concerns.

Each processing unit provides a monitor value that typically reflects power consumption and/or temperature information to the monitor 110 via signals such as Power Consumption (PC) lines PC-1 through PC-N. The monitor value may take a variety of forms and may be a variety of different types of information. For example, the monitor value may simply be an analog or digital reading of the temperature of each processing unit. Alternatively, the monitor value may be a simple or complex activity factor that reflects the operational activity of a particular processing unit. In some embodiments, power consumption information reflected by the monitor value may include a measured current level or other indication of how much power is being consumed by the processing unit. Additionally, some embodiments may convey power consumption information to the monitor 110 that is a composite of several of these or other types of known or otherwise available means of measuring or estimating power consumption. Accordingly, some power consumption metric which reflects one or more of these or other power consumption indicators may be derived. The transmitted monitor value may reflect a temperature or a power consumption metric, which itself may factor in a temperature. Serial, parallel, and/or various known or otherwise available protocols may be used to transmit this information to the power monitor.

The monitor 110 receives the power consumption information from the various processing units and analyzes whether power consumption between the units is sufficiently uneven to justify the overhead of re-allocating processes to different processing units. For example, the monitor may be triggered to rearrange processes when a particular processing unit reaches a certain temperature, when a selected temperature differential is achieved between different processing units, when power consumption has been at a selected level for a selected amount of time, etc. The monitor 110 may develop a total power consumption metric to indicate the total power consumption or total thermal state of all processing units to effectuate the various power control strategies. The monitor 110 may be a hardware component, a software component, routine, or module, or a combination of hardware and software.

The monitor communicates to the processing units via Thread or Process Swap Control (SC) lines SC-1 through SC-N. The monitor is capable of moving and exchanging processes by sending commands via the SC lines. Thus, processes can be swapped between processing units, rotated between processing units, etc., in response to the particular chosen thermal or power consumption metric being reached. Alternatively, or in addition to power consumption metric triggered process management, process rotation between processing units may be periodically performed to level the load between the processors.

Many different types of processing devices could benefit from the use of such process re-allocation techniques. For example, the processing units 100-1 through 100-N may be general purpose processors (e.g., microprocessors) or may be microprocessor cores for a multiple core (on a single die) microprocessor. Alternatively, digital signal processors, graphics processors, network processors, or any type of special purpose processor that may be used in a system with multiple parallel units or cores may benefit from thermally (or power) motivated process shifting between processing units. The processing units or processors may be identical or have at least partial functional overlap. That is, each processing unit has some common set of instructions or commands such that there are at least some (if not all) processes that can be executed on more than one processing unit or processor.

Figure 2:
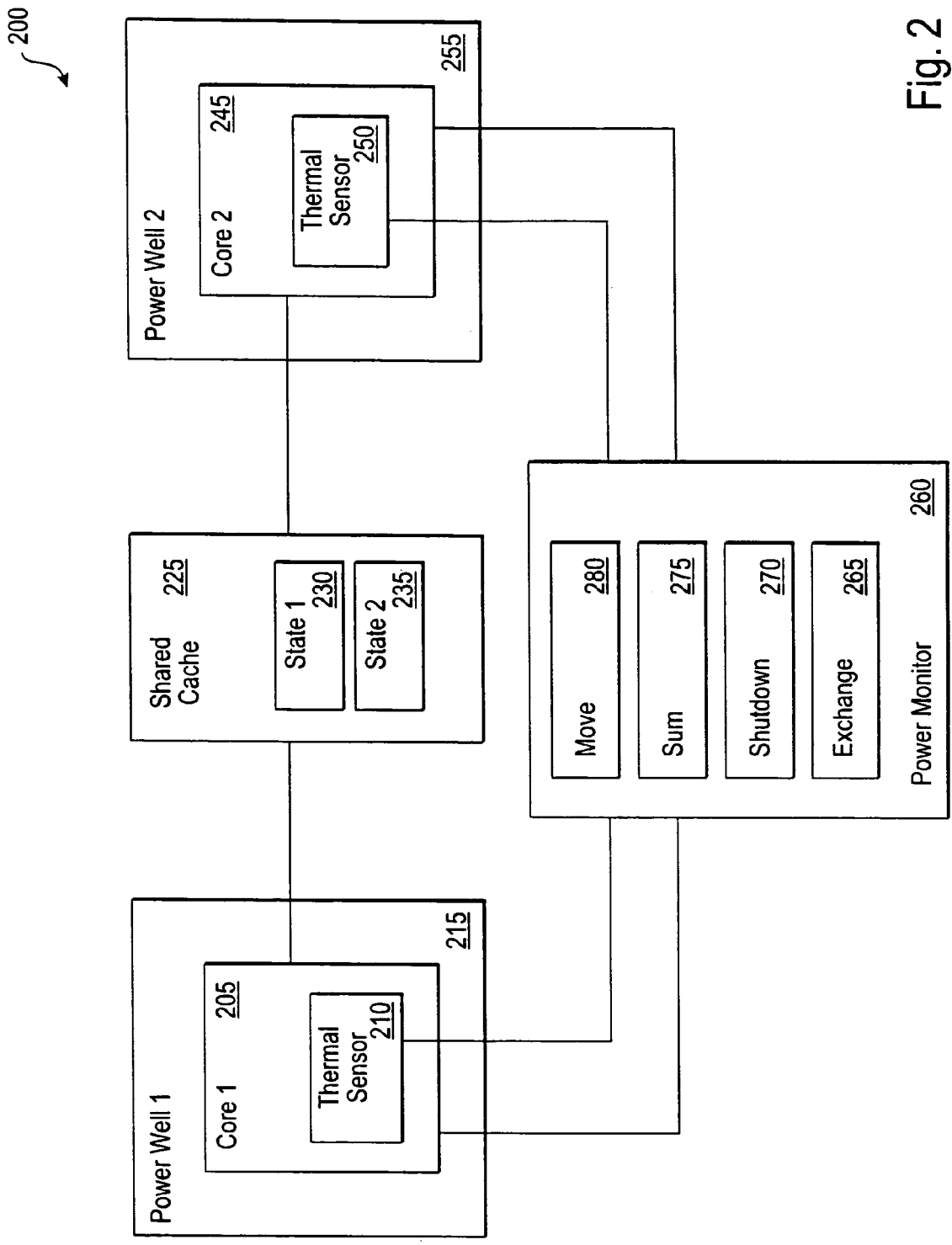
FIG. 2 illustrates one embodiment of a dual core processor and an associated monitoring module.

FIG. 2 illustrates one embodiment that may be useful for general purpose microprocessors. In particular, in the embodiment of FIG. 2, power consumption or thermally motivated process swapping can be performed in the context of a dual core processor 200 on single integrated circuit. Additionally, in the embodiment of FIG. 2, a shared cache 225 (e.g., a shared L2 or L3 cache) may be useful in facilitating swapping between a first core 205 and a second core 245. The shared cache 225 can store first and second sets of state variables (state 1 230 and state 2 235) to allow swapping state between the two cores without needing to rely on slower external memory. Specific microcode routines or other logic may be used to store state information only in the cache 225 and not in external memory in order to reduce the overhead associated with swapping processes. The state variables may be stored in dedicated portions of the cache or may be stored in general purpose cache memory, with other data being evicted if necessary to make room for the appropriate state information.

In the embodiment of FIG. 2, a power monitor 260 receives information from both cores to allow analysis of power consumption and/or temperature for each specific core as well as the overall processor. In particular, in the embodiment of FIG. 2, the core 205 includes a thermal sensor 210. The power monitor 260 is coupled to receive data from the thermal sensor 210. Likewise, the core 245 includes a thermal sensor 250, which provides information about the thermal state of the second core 245 to the power monitor 260. Typically, integrated circuit thermal sensors located in the vicinity of or within the particular core may be used to provide a relatively accurate assessment of the thermal state of that core. A set of thermal sensors may also be spread over an area to provide a more accurate reading.

Various thermal sensors are known in the art and the particular technique used is not particularly germane to the present invention. Moreover, known substitutes for measuring temperature or power consumption may be used. For example, basic measurements of activity level, current received, etc., may also provide a power consumption metric adequate for the power monitor 260 to make process swapping decisions.

The power monitor 260 of this embodiment includes various modules, including a move module 280, a sum module 275, a shutdown module 270, and an exchange module 265. The power monitor 260 and/or each module may be entirely hardware (perhaps including microcode) and therefore built in to the dual core processor 200, or may rely on additional external software, firmware, or configuration settings to control or assist with tracking and migration of processes from one core to the other.

Figure 3:
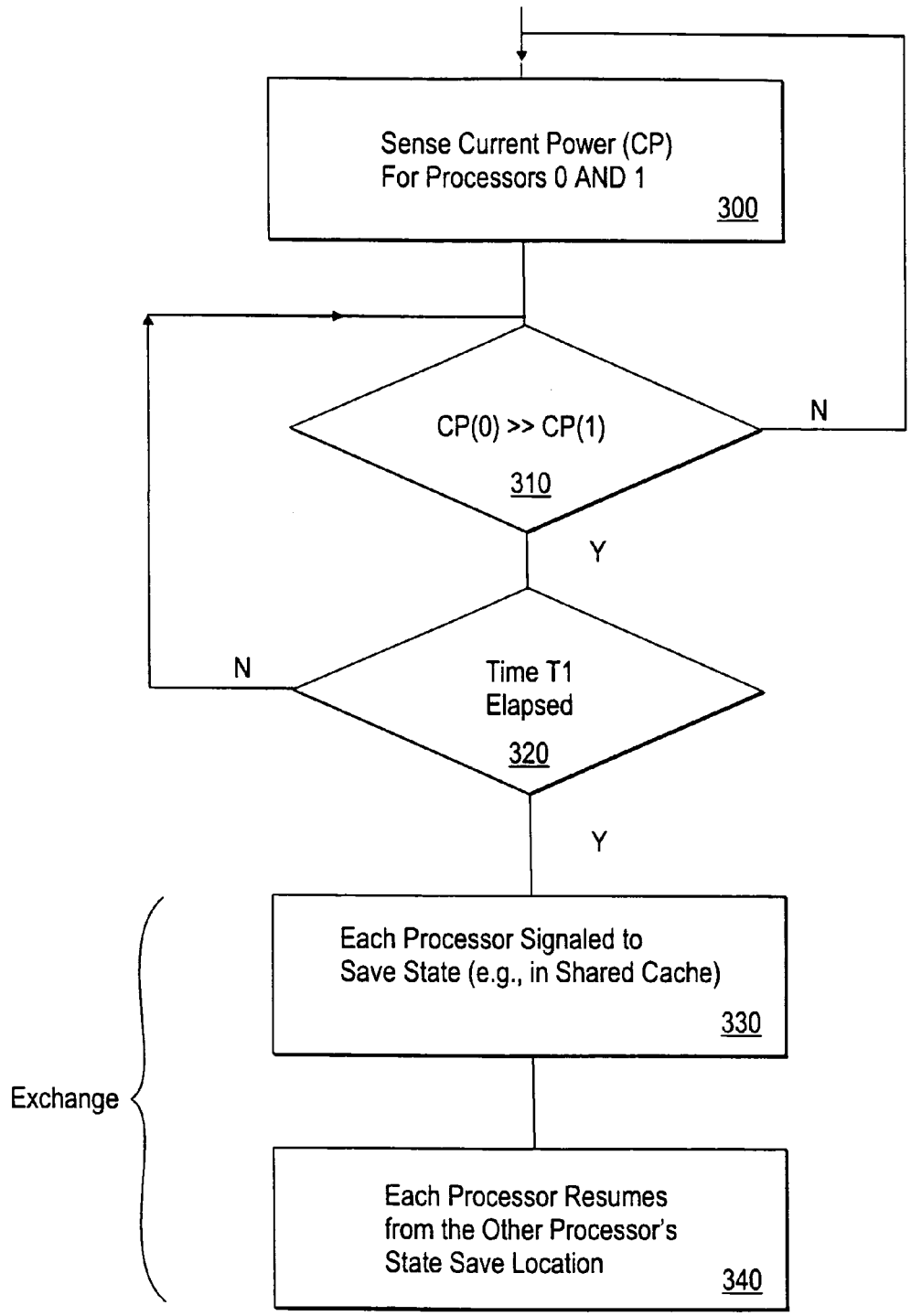
FIG. 3 is a flow diagram of one embodiment of monitoring including an exchange operation.

The exchange module 265 is capable of performing an exchange operation between the two cores. One embodiment of a monitoring sequence including an exchange operation is shown in FIG. 3. In block 300, the current power (CP) is sensed for the two cores (e.g., cores 205 and 245). As previously discussed, the current power measurement may include a variety of power consumption metrics, typically metrics averaged, integrated, or otherwise calculated over time. The current power consumption of the two processors is compared, as indicated in block 310. While block 310 indicates a test of whether CP(0)>>CP(1), the converse test of whether CP(1)>>CP(0) would typically also be performed, as may comparisons between numerous processing units in embodiments with more than two processing units. If there is a large discrepancy between the two power consumption values, it may be desirable (though not required, depending on the metric used) to wait until a particular time elapses as indicated in block 320. If there is not a large discrepancy between the two, the procedure may return to sensing the current power consumption in block 300.

When the power monitor 260 detects that the power consumed by one core is very high compared to the second core over some period of time in block 320, the power monitor 260 exchanges (blocks 330 and 340) the location of the running processes. In some embodiments, such an exchange may help to avoid hot spots. For example, the first core 205 may be running process A and the second core 245 running process B. Since the core 205 reaches a significantly higher temperature over a period of time, process A is deemed to be a "hotter" process than process B. Accordingly, the overall distribution of the power consumption of the entire die could be improved by moving process A to the second core 245 and the process B to the first core 205 for some time to equalize the core temperatures. In some embodiments, swapping may be of larger concern when one processing unit exceeds some threshold level of power consumption. For example, swapping may be limited to times when CP1 is greater than a particular threshold and CP1 is much greater than CP0. Such an embodiment avoids the overhead of process swapping when the overall power consumption is not high enough to justify such process swapping.

As indicated in block 330, in response to the detection of the substantial core power consumption imbalance in block 330, each processor is signaled to save its state. In one embodiment, the power monitor 260 generates a trap or an interrupt. In many general purpose processors, traps or interrupts are already designed to allow the processor to save its context for later resumption. Thus, an existing trap or interrupt routine or a special purpose trap or interrupt routine may be used to force the core to save its state in a manner similar to other known state saving operations used to accommodate disruptive events without losing information. Alternatively, portions of existing microcode routines or modified routines for traps may be utilized. As previously mentioned, in some embodiments it may be advantageous to use the shared cache 225 to perform on-die exchanges between two cores of a multi-core processor. Thus, state 230 for process A and state 235 for process B may be stored in the cache 225.

As indicated in block 340, after each processor has saved its state, each processor resumes using the state saved by the other processor. Thus, core 205 resumes process B by restoring state 235 instead of restoring the state it saved from process A. Likewise, core 245 resumes process A by restoring state 230. Various techniques may be used to ensure the other state is restored. For example, a microcode routine could be used to alter the location from which the processor restores its state. Alternatively, the cache or other logic could swap which state is returned to which processor. The process swap may be done with operating system assistance in some embodiments, but operating system assistance is not required, and some embodiments implement process swapping without alerting the operating system and/or gaining assistance from the operating system. Whatever particular technique is chosen, the processes A and B resume execution on a different core.

Another operation that may be performed by the power monitor 260 is a shutdown operation, which is performed by a shutdown module 270. The shutdown operation may be performed either in response to a core reaching a failsafe temperature threshold requiring shutdown to avoid damage or failure or because the core is idle. In either case, the core is shut down. In some embodiments, shutdown may involve saving the state of the core that is shut down. Additionally, power may be removed from the power well of that core. For example, as shown in FIG. 2, the core 205 may be in a power well 215 that is separate from the power well 255 for the core 245. Power may be shut off to just one of the power wells.

Figure 4:
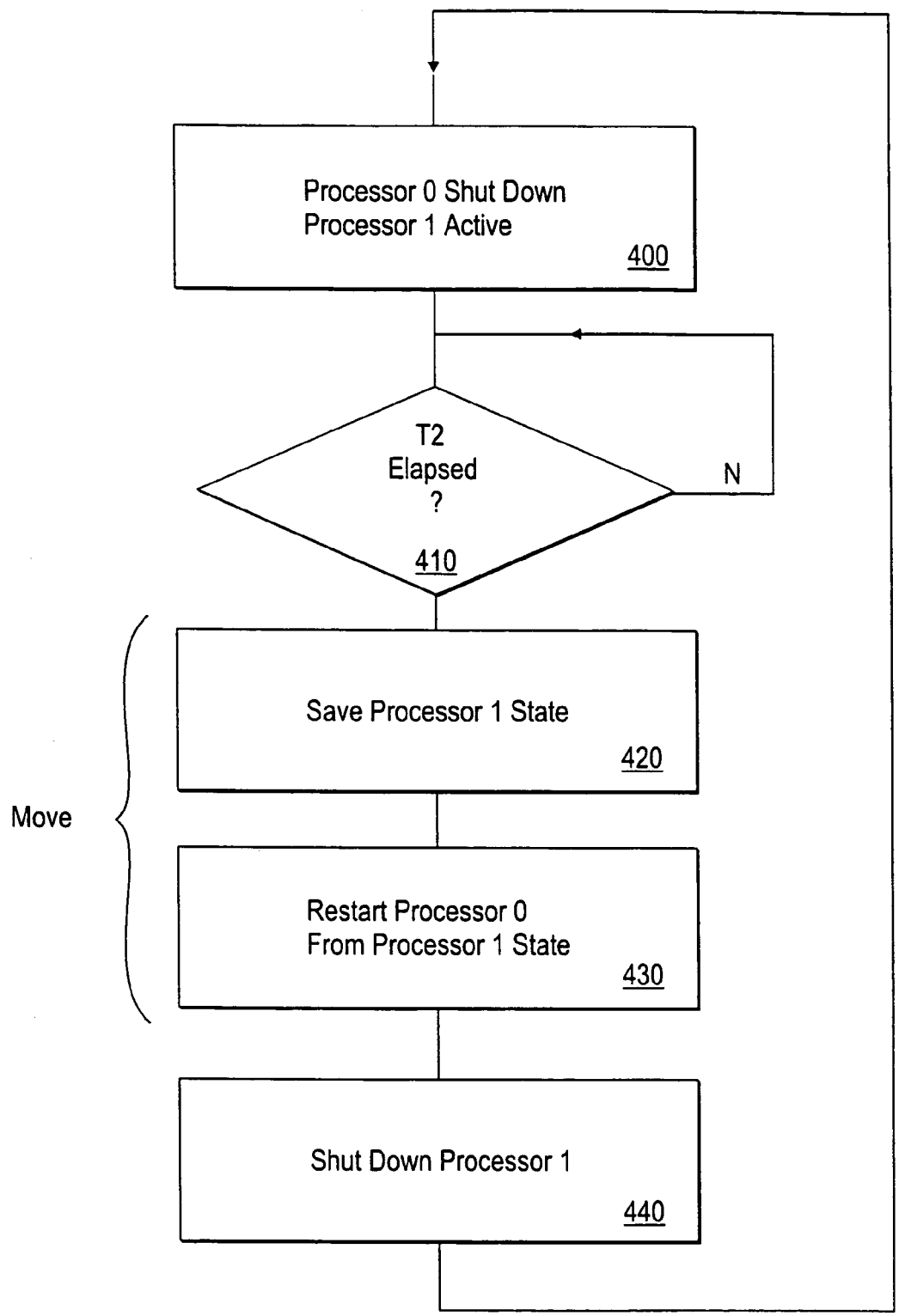
FIG. 4 is a flow diagram of one embodiment of monitoring including a move operation.

FIG. 4 illustrates yet another sequence of monitoring events, this one including a move operation orchestrated by the move module 280. Only one processor may be active due to a idleness (e.g., resulting in a shutdown) of the other processor or for other reasons as indicated in block 400. When only one processor is active, the move operation may be used to spread the power more efficiently (e.g., for faster cooling). As indicated in block 410, a time T2 elapses with only one processor active. If T2 has not elapsed, the process returns to block 410. If T2 has elapsed, then the process continues with the state of the first processor being saved in block 420. In block 430, the other processor is restarted from the state of the processor that was active. The previously active processor is then shut down, as indicated in block 440. The process then beings again with the processors reversed. Thus, periodically (e.g., every few milliseconds), the power monitor wakes the sleeping or shutdown processor, moves the context of the running processor to the previously sleeping processor, and puts the previously running processor in a low-power sleep or shutdown state. As previously mentioned with respect to FIG. 3, process swapping may be limited in some embodiments to when the power consumed exceeds a minimum threshold. The overhead of moving processes itself not only impacts performance, but also causes additional power consumption. Therefore, a minimum threshold may be set to prevent moving of processes when power consumption is at a relatively low level.

Another operation that may be performed by the power monitor 260 is a sum operation, which is performed by a sum module 275. The sum operation assists in assuring that the total sum of power of all processing units controlled by a power monitor falls within a desired power envelope. If the power exceeds the prescribed limit, the power monitor in response throttles processing (e.g., decrease voltage and/or frequency of some of the cores).

Additionally, the sum module 275 ensures that processing throughput is increased to the extent possible given the desired thermal envelope. Thus, the sum module may also detect when the total power consumption falls below a certain level. Voltages or frequencies to one or both of the cores may be ratcheted up in order to improve performance when the sum module detects that overall power consumption is below a selected power consumption metric.

Figure 5:
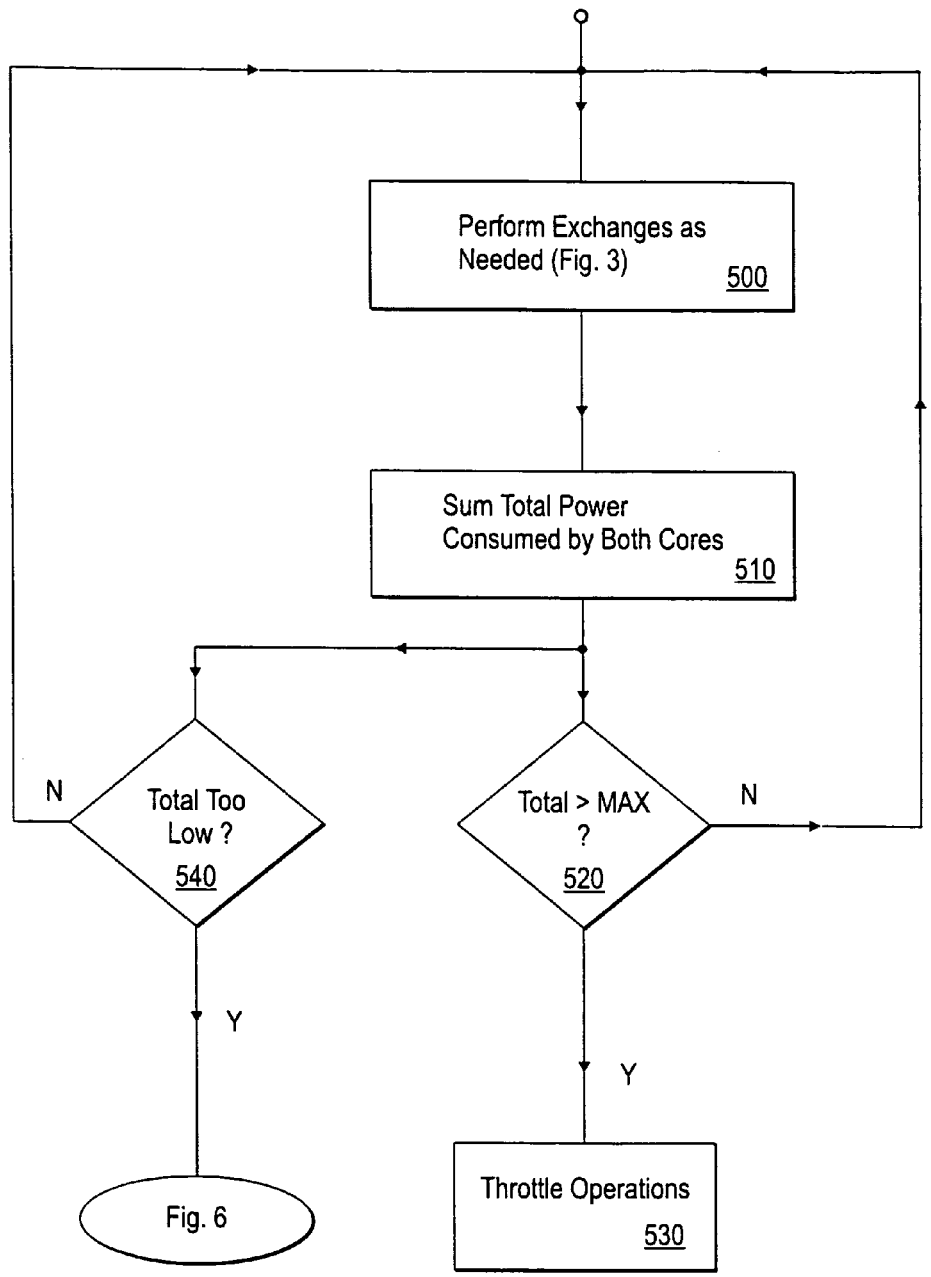
FIG. 5 is a first portion of a flow diagram of one embodiment of a monitoring sequence.
Figure 6:
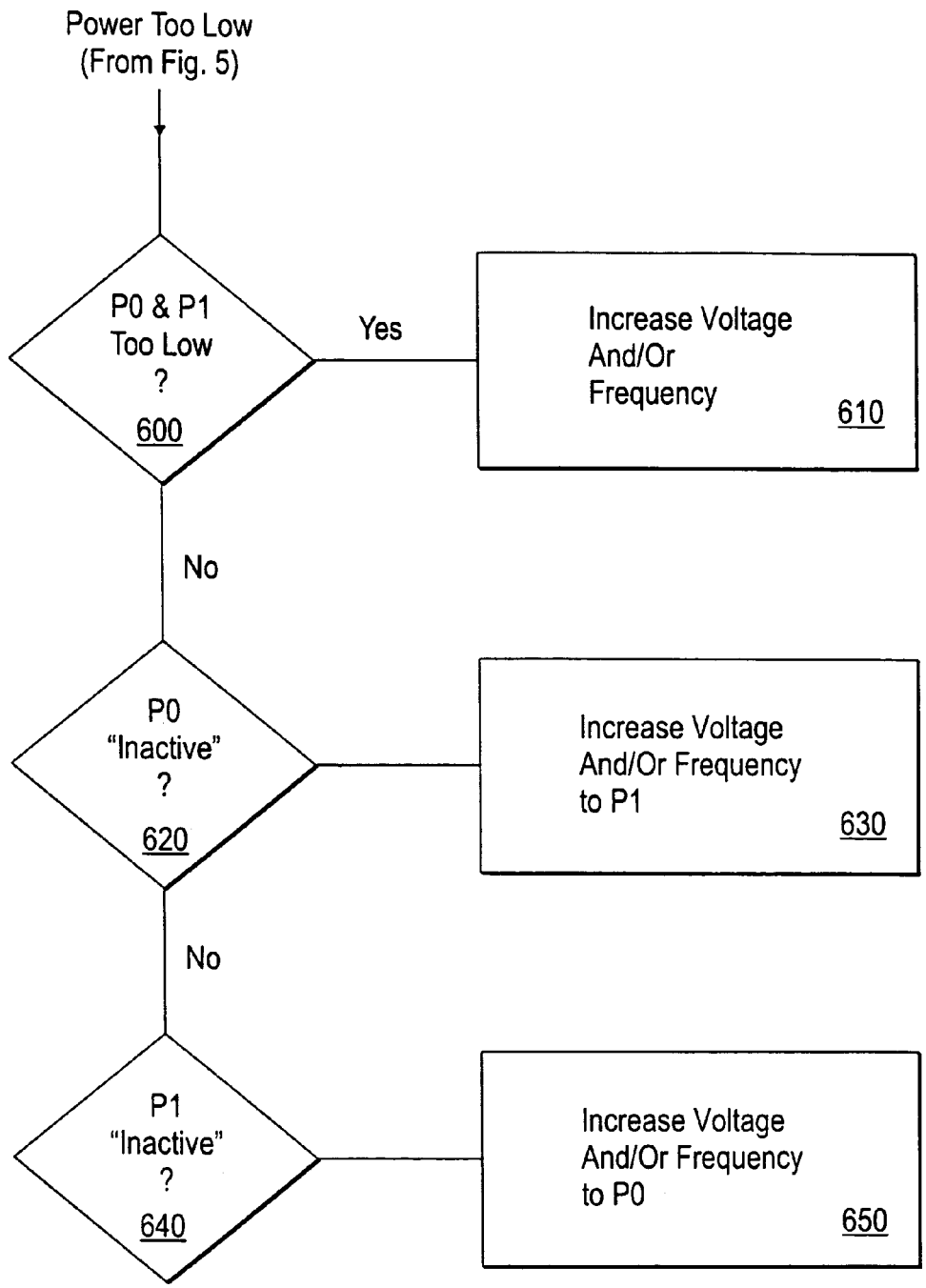
FIG. 6 illustrates a second portion of the flow diagram of FIG. 5.

The flow diagram of FIGS. 5 and 6 illustrates a monitoring sequence for one embodiment when multiple processing units are active. The sequence of FIGS. 5 and 6 includes exchanges and increasing or decreasing processing in response to summing operations. Notably, as with other flow diagrams, the operations illustrated are not necessarily performed sequentially or if they are performed sequentially, they are not necessarily performed in the illustrated order in all cases. In the illustrated embodiment, exchanges are performed as needed, as indicated in block 500. Thus, high and low power processes are swapped between processing units in order to even out the physical distribution of the power consumption. Additionally, as indicated in block 510, the sum of total power consumed by both cores is calculated (e.g., by the sum module).

The sum total is compared to the desired power envelope for the system or the processor itself. One of skill in the art determines a power or thermal envelope for a part depending on the thermal characteristics of the materials used to build that part, the system environments in which that part is used, the desired performance, and other factors. Similarly, a power or thermal envelope for the system may be determined. In block 520, whether the sum total of power consumption is too high is tested. If the sum total of power consumption is not too high, then the process begins again at block 500. If the sum total of power consumption is too high, then operations are throttled as indicated in block 530 and as previously described with respect to the sum module. If not, then the process returns to block 500.

In block 540, whether the sum total of power consumption is too low is tested. If not, then the process begins again at block 500. If the sum total of power consumption is too low given the desired system power or thermal envelope, then the process continues with block 600 in FIG. 6. In block 600, whether both processors are active and the power is still too low is tested. If both processors are active, then voltage and/or frequency to both processors may be increased as indicated in block 610. For example, in the embodiment of FIG. 2, the voltage level to the two power wells may be increased and/or a clock frequency for each core 205 and 245 may be increased. In another embodiment, the voltage or frequency of one of the two processors may be favored over the other. For example, the operating system may provide control settings indicating which processor or process to favor if additional processing power is available. Alternatively, the processor may develop an indication of which processor or process tends to consume more power over time, and may favor that process with additional power, should the present level of processing only put the processor at the low or safe end of its thermal envelope. Whether the executing processes would benefit from additional processing power may also be considered in some embodiments. Thus, in some embodiments, no adjustments are made despite being at the low end of a thermal envelope if the executing processes are progressing adequately.

If both processors are not active and the power too low in block 600, then whether a first one of the processors is inactive is tested in block 620. If so, then the voltage and/or frequency to the other processor may be increased, as indicated in block 630. On the other hand, if the first processor is not inactive, then block 640 tests whether the second processor is inactive. If so, the voltage and/or frequency to the first processor may be increased in block 650.

Accordingly, when a processor is operating at the low end of its thermal envelope, the processing of either or both cores may be increased appropriately. Moreover, such techniques can of course be applied to any of a variety of processing units as previously discussed. Processing may be shifted about between units, cores, circuits, modules, etc., to more evenly distribute heat generation across these various components and/or to increase the amount of processing that can be performed given a thermal or power envelope.

Finally, the power monitor 260 may include a battery mode optimization module (not shown). The battery mode optimization module may allow the dual core processor to only operate one of the two cores when operating on battery power (or when battery power falls below a selected threshold). Once the system is connected to alternating current power (or the battery is recharged), both cores may be operated for higher performance.

Figure 7:
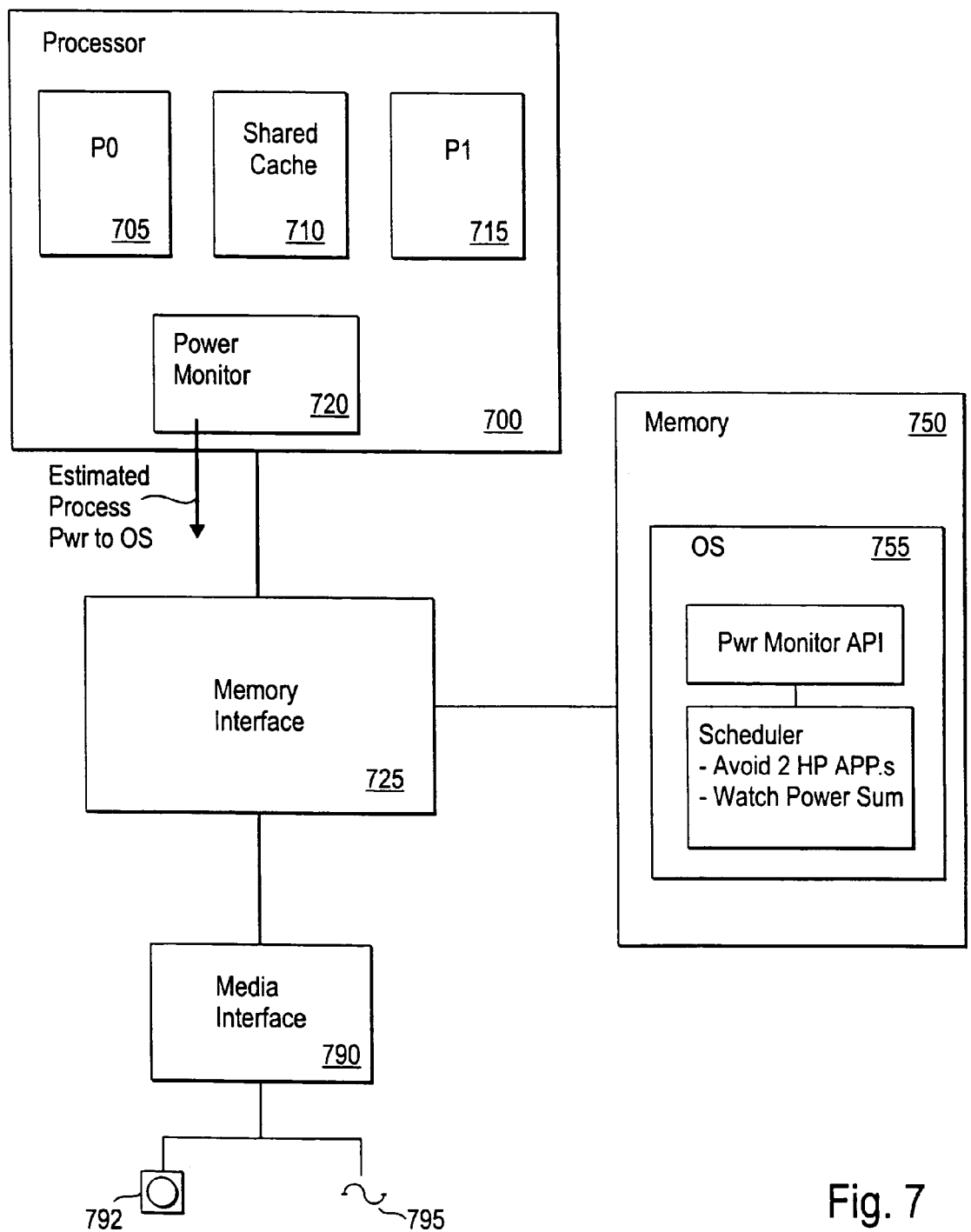
FIG. 7 illustrates one embodiment of a multi-core processor system.

FIG. 7 illustrates one embodiment of a multi-core processor system using operating system routines to assist in managing thermal concerns. The embodiment of FIG. 7 includes monitoring logic 720 as a part of a dual core processor 700. The dual core processor includes a first processor 705 and a second processor 715. A shared cache 710 physically separates the two processors 705 and 715. Thus, the shared cache provides some thermal isolation between the two cores.

The processor 700 is coupled to a memory interface 725, which is coupled to a memory 750 and a media interface 790. Other known or otherwise available system arrangements may be used as will be appreciated by one of skill in the art. The memory 750 includes an operating system 755 which includes a power monitor routine such as an application programming interface (API) and a scheduler. In this embodiment, the OS provides a power monitor API in order to acquire information about the computational intensity or the likely power consumption of particular processes to the operating system. Information about the computational intensity of a program may be provided by the program itself, by a user, or derived from execution of the program. With this information, the operating system scheduler can avoid scheduling multiple high power applications on one processor. Rather, the operating system can assist in leveling the distribution of the power consumption by scheduling high power processes on different processors.

Additionally, the operating system (or other routines in memory) may provide some or all of the power monitor functionality. As indicated in FIG. 7, the processor communicates on-die estimated process power to the operating system or other software. The software can then determine when it would be desirable to move, swap, etc., processes as previously described. Moreover, software may be responsible for summing and other operations. Furthermore, software estimation techniques may be used instead of on-die sensors or estimation logic.

The appropriate software to perform these various functions may be provided in any of a variety of machine readable mediums. The media interface 790 provides an interface to such software. The media interface 790 may be an interface to a storage medium (e.g., a disk drive, an optical drive, a tape drive, a volatile memory, a non-volatile memory, or the like) or to a transmission medium (e.g., a network interface or other digital or analog communications interface). The media interface 790 may read software routines from a medium (e.g., storage medium 792 or transmission medium 795). Machine readable mediums are any mediums that can store, at least temporarily, information for reading by a machine interface. This may include signal transmissions (via wire, optics, or air as the medium) and/or physical storage media 792 such as various types of disk and memory storage devices. In any case, the power monitoring functionality may in some cases be provided wholly or in part by software routines.

Thus, a method and apparatus for distribution of processing activity across processing hardware based on power consumption and/or thermal considerations are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A multicore processor comprising:
   a plurality of processor cores;
   a monitor to obtain a plurality of monitor values from said plurality of processor cores, wherein said monitor is to transfer a process from a first processor core of said plurality of processor cores to a second processor core of said plurality of processor cores in response to said plurality of monitor values.

2. The multicore processor of claim 1 wherein said monitor is to transfer the process from a first processor core of the plurality of processor cores to a second processor core of the plurality of processor cores in response to a first one of said plurality of monitor values being greater than a second one of said plurality of monitor values over a period of time.

3. The multicore processor of claim 2 wherein each monitor value comprises an activity factor.

4. The multicore processor of claim 3 wherein each monitor value is integrated over time.

5. The multicore processor of claim 3 wherein each monitor value is averaged over time.

6. The multicore processor of claim 2 wherein each monitor value comprises a temperature indicator.

7. The multicore processor of claim 6 wherein each monitor value is integrated over time.

8. The multicore processor of claim 6 wherein each monitor value is averaged over time.

9. The multicore processor of claim 2 wherein each monitor value comprises a power consumption estimate.

10. The multicore processor of claim 1 wherein each monitor value comprises a composite of multiple power/temperature information items.

11. The multicore processor of claim 10 wherein each monitor value is integrated over time.

12. The multicore processor of claim 10 wherein each monitor value is averaged over time.

13. The multicore processor of claim 10 wherein the composite includes an activity factor and a temperature indication.

14. The multicore processor of claim 13 wherein each monitor value is integrated over time.

15. The multicore processor of claim 13 wherein each monitor value is averaged over time.

16. The multicore processor of claim 1 wherein each of said plurality of processor cores is in a separate power well, wherein said monitor is to power down an idle processor core.

17. The multicore processor of claim 1 wherein said monitor is to independently control voltage and frequency for each of the plurality of processor cores.

18. The multicore processor of claim 17 further comprising a plurality of power consumption lines coupling each of the plurality of processor cores to the monitor, wherein a serial protocol is used to transmit information from each of the plurality of processor cores to the monitor.

19. The multicore processor of claim 1 wherein a selected one of the plurality of processor cores is favored over others.

20. The multicore processor of claim 19 wherein said selected one of the plurality of processors consumes more power than another one of the plurality of processors.

21. The multicore processor of claim 1 wherein the monitor is to favor a higher power consumption processor of the plurality of processor cores if the multicore processor is within a safe region of a thermal envelope.

22. The multicore processor of claim 3 wherein said multicore processor is one of a network processor and a graphics processor.

23. The multicore processor of claim 3 further comprising a memory to facilitate swapping processes, said memory to store context information for the process from the first processor core for retrieval by the second processor core without access to an external memory.

24. An apparatus comprising:
    a single integrated circuit comprising a plurality of processor cores, each of the plurality of processor cores comprising instruction execution logic and core state variable storage;
    a module to obtain a plurality of values from said plurality of processor cores, wherein said module is to transfer a process from a first processor core of said plurality of processor cores to a second processor core of said plurality of processor cores in response to said plurality of values.

25. The apparatus of claim 24 wherein said module is a portion of the single integrated circuit.

26. The apparatus of claim 24 wherein said module comprises hardware and software.

27. The apparatus of claim 24 wherein each of said plurality of values comprises a metric indicative of power consumption and/or temperature.

28. The apparatus of claim 24 wherein each of said plurality of values comprises an activity factor.

29. The apparatus of claim 24 wherein said module is to remove power from an idle one of said plurality of processor cores.

30. An apparatus comprising:
    a single integrated circuit comprising a plurality of processor cores, each of the plurality of processor cores comprising instruction fetch and execute logic and storage for a plurality of core state variables;
    a module to obtain a plurality of values from said plurality of processor cores, wherein said module is to move processes between said plurality of processor cores in response to said plurality of values.

31. The apparatus of claim 30 wherein said module is a portion of the single integrated circuit.

32. The apparatus of claim 30 wherein said module comprises hardware and software.

33. The apparatus of claim 30 wherein each of said plurality of values comprises a metric indicative of power consumption and/or temperature.

34. The apparatus of claim 30 wherein said module is to swap processes between said plurality of processor cores periodically.

35. The apparatus of claim 30 wherein said module is to transfer a first process from a first processor core of said plurality of processor cores to a second processor core of said plurality of processor cores in response to a substantial core power consumption imbalance.

36. The apparatus of claim 35 wherein said module is to transfer the first process from the first processor core of said plurality of processor cores to the second processor core of said plurality of processor cores in response to the first processor core having the substantial core power consumption imbalance relative to the second processor core over a period of time.

37. The apparatus of claim 36 wherein said module is to transfer the first process from the first processor core of said plurality of processor cores to the second processor core of said plurality of processor cores in response to the core power consumption imbalance only if a power consumption threshold is exceeded.

38. The apparatus of claim 30 wherein said module is only to transfer a first process from a first processor core of said plurality of processor cores to a second processor core of said plurality of processor cores if a power consumption threshold is exceeded.

39. The apparatus of claim 30 wherein said module is to transfer a first process from a first processor core of said plurality of processor cores to a second processor core of said plurality of processor cores in response to the first processor core having a very high rate of power consumption relative to the second processor core over a period of time.

40. The apparatus of claim 30 wherein a selected one of the plurality of processor cores is favored over others, wherein said selected one of the plurality of processor cores consumes more power than another one of the plurality of processors.

41. The apparatus of claim 38 wherein the module is to favor a higher power consumption processor of the plurality of processor cores if the multicore processor is within a safe region of a thermal envelope.

42. An apparatus comprising:
a single integrated circuit comprising a plurality of processor cores, each of the plurality of processor cores comprising instruction fetch and execute logic and storage for a plurality of core state variables;
a module to transfer processes between said plurality of processor cores after a predefined period of time.

43. The apparatus of claim 42 wherein said module is to periodically transfer processes between said plurality of processor cores.

44. The apparatus of claim 43 wherein said module is to shutdown an idle one of said plurality of processor cores.

45. The apparatus of claim 44 wherein each of said plurality of processor cores has a power supply and wherein said module is to remove said power supply from said idle one of said plurality of processors.

46. The apparatus of claim 42 wherein said module is to transfer processes by rearranging a plurality of processes operating on said plurality of processor cores.

47. A method comprising:
performing exchanges of processes between a plurality of cores of a multicore processor;
summing a total power consumed by said plurality of cores of the multicore processor;
if a total power consumed is too high, then throttling operations,
if the total power is too low, then increasing processing.

48. The method of claim 47 wherein increasing processing comprises:
if a first core is inactive, then increasing a voltage and/or frequency of a second core;
if the second core is inactive, then increasing a voltage and/or frequency of the first core;
if said first core and said second core are active then increasing the voltage and/or frequency of both the first core and the second core.

* * * * *